United States Patent [19]
He

[11] Patent Number: 6,029,184
[45] Date of Patent: *Feb. 22, 2000

[54] METHOD OF PERFORMING UNSIGNED OPERATIONS WITH SIGNED INSTRUCTIONS IN A MICROPROCESSOR

[75] Inventor: Liang He, Sunnyvale, Calif.

[73] Assignee: Sun Microsystems, Inc., Palo Alto, Calif.

[*] Notice: This patent is subject to a terminal disclaimer.

[21] Appl. No.: 08/877,398

[22] Filed: Jun. 17, 1997

[51] Int. Cl.[7] .................................................. G06F 7/38
[52] U.S. Cl. .......................... 708/204; 708/670; 708/490
[58] Field of Search .................... 364/715.03, 748.11, 364/768, 736.01, 748.01; 341/50; 395/562, 563; 708/204, 670, 500, 490; 712/221, 222

[56] References Cited

U.S. PATENT DOCUMENTS 4,935,890  6/1990  Funyu ..................................... 708/204
5,745,125  4/1998  Deering et al. .......................... 345/503
5,801,975  9/1998  Thayer et al. ........................... 708/402

FOREIGN PATENT DOCUMENTS 489552  6/1992  European Pat. Off. .

OTHER PUBLICATIONS

Japanese Abstract No. 362224830; Ushinmei, Oct. 1987.

Japanese Abstract No. 405303498; Nakamura et al., Nov. 1993.

*Primary Examiner*—Kenneth Coulter
*Attorney, Agent, or Firm*—Fish & Richardson P.C.

[57] ABSTRACT

A method of controlling a microprocessor to transform unsigned data to a signed format so that the unsigned data can be processed by signed instructions. In particular, a subtraction between two unsigned numbers can be transformed into a subtraction between two signed numbers.

3 Claims, 3 Drawing Sheets

METHOD OF PERFORMING UNSIGNED OPERATIONS WITH SIGNED INSTRUCTIONS IN A MICROPROCESSOR

FIELD OF THE INVENTION

The present invention relates to operations of a microprocessor. More particularly, the present disclosure describes a method of controlling a microprocessor to perform signed arithmetic instructions for operations with unsigned data.

BACKGROUND OF THE INVENTION

Operations of digital microprocessors are based on binary data. Binary data can be formed to represent signed data or unsigned data. Signed data can be used to represent both positive and negative numbers. In most cases, unsigned data can only represent positive numbers. Arithmetic instructions of a microprocessor process information in the form of signed and unsigned digital data and control many operational processes of the microprocessor.

Various prior art systems have separate operations for different kinds of information. For example, a system may use "signed" arithmetic instructions for some arithmetic operations which operate only with signed numbers. Conversely, instructions for some arithmetic operations may operate only with unsigned numbers and are therefore referred to as "unsigned" arithmetic instructions.

For example, an instruction called "vis_pdist" in the Visual Instruction Set (VIS) of UltraSPARC processors controls a microprocessor to compute the sum of the absolute difference between a pair of eight-pixel unsigned binary bit sets. This instruction is described in the "VIS User's Manual", release 1.0, from Sun Microsystems, April, 1996. One application of this instruction is to accelerate motion compensation to support real-time video compression. However, the current implementation of the vis_pdist instruction can be used only for unsigned data. Other examples of instructions which can only be applied to signed data are also known, such as the instructions fpsub16 and pfsub32 on UltraSPARC processors.

Such division between signed and unsigned operations is limiting in the operation efficiency of a microprocessor.

SUMMARY OF THE INVENTION

The inventor recognized that many applications require operations for both signed and unsigned data. In view of this recognition, the inventor has discovered techniques allowing implementing a signed arithmetic instruction that can operate on unsigned data.

The inventor has discovered additional techniques allowing implementing an unsigned instruction on signed data.

Therefore, the capabilities of a microprocessor are enhanced by controlling the microprocessor in a special way so that a signed arithmetic instruction can be used on unsigned data. The microprocessor is also controlled such that an unsigned instruction can be used on signed data.

One aspect of the present invention is an implementation of a data transforming mechanism in a microprocessor which renders the instructions thereof transparent to the type of data.

Another more specific aspect of the present invention is to expand the functionality of the Visual Instruction Set (VIS), thereby enhancing the performance of UltraSPARC processors.

A preferred microprocessor for performing signed and unsigned operations implements a data transformation mechanism that implements the steps of:

using a data transformation to change a data representation of a first form for data that is originally in a second form, one of said first form and said second form representing a signed format and another representing an unsigned format;

transforming a second form operation of said data in said second form controlled by a second form instruction into a first form operation in said data representation of said first form; and using said microprocessor to perform an unsigned operation on unsigned data using a signed instruction, and a signed operation on signed data using an unsigned instruction.

BRIEF DESCRIPTION OF THE DRAWINGS

These and other aspects and advantages of the present invention will become more apparent in light of the following detailed description of preferred embodiments thereof, as illustrated in the accompanying drawings, in which.

DESCRIPTION OF THE PREFERRED EMBODIMENTS

The present invention implements a mechanism in a microprocessor to transform an item of data between signed and unsigned formats so that the data can be processed by both signed and unsigned instructions. In particular, a mechanism of performing transformation between signed and unsigned formats for operations on subtraction is disclosed in the present disclosure. According to the invention, an operation between two signed numbers, such as integers, can be transformed into another equivalent operation between two unsigned integers as needed. Conversely, an operation between two unsigned numbers can be transformed into an equivalent operation between two signed numbers. The transformations do not change the end results of the operations.

Figure 1:
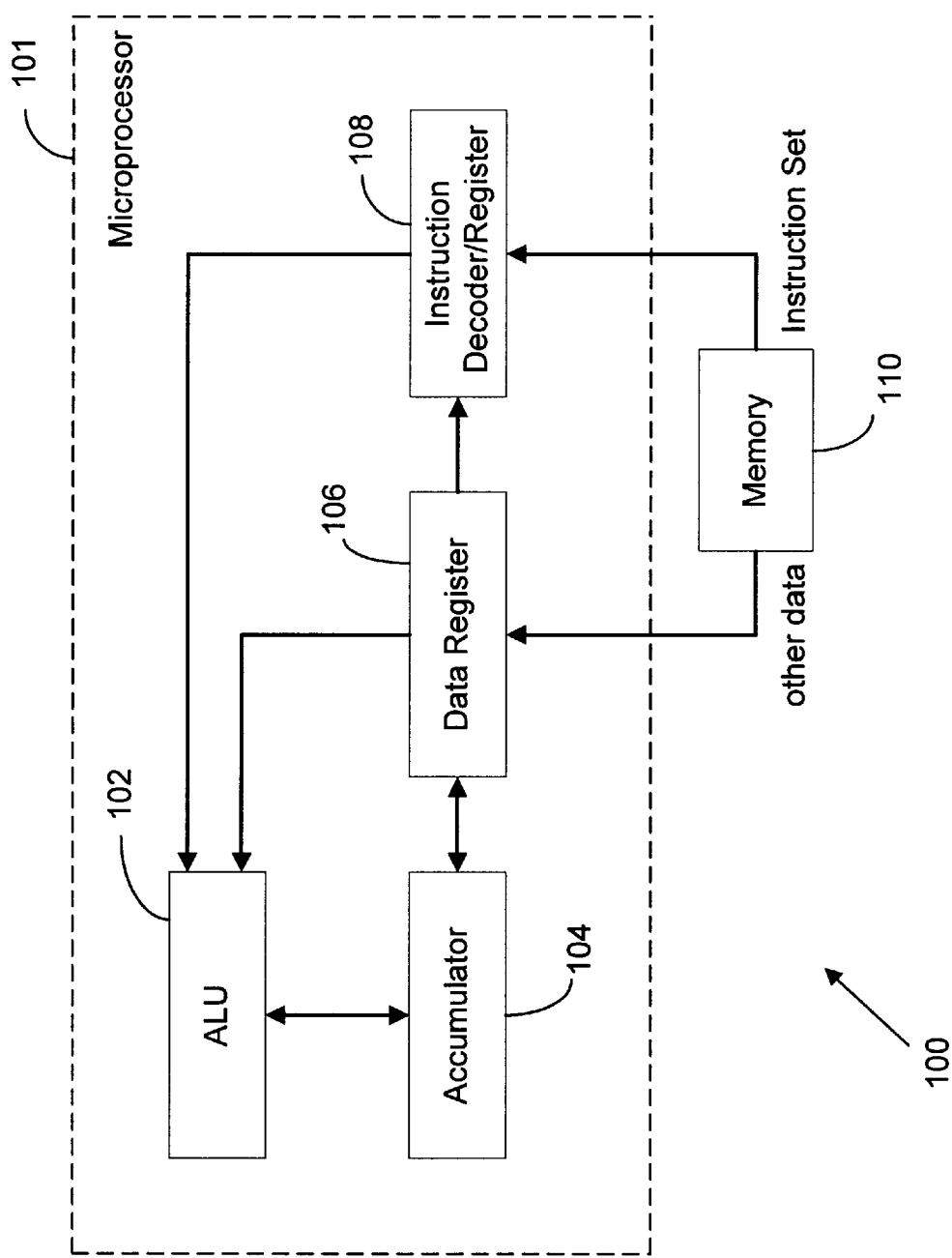
FIG. 1 is a block diagram showing an exemplar microprocessor.

FIG. 1 shows an exemplary microprocessor 101 in accordance with the invention. An arithmetic logic unit (ALU) 102 performs arithmetic and logic operations including binary addition, subtraction, multiplication, division, and a number of logical comparisons. The instruction set for the microprocessor 101 controls, at least in part, the operations of ALU 102. The instruction set can be stored in a memory unit 110 which can be either an built-in memory in the microprocessor and/or an external memory. The data from the data register 106 may be transformed into a desired format (e.g., from signed to unsigned) prior to an execution of an operation by the ALU 102.

Unsigned integer data of N bits can be represented in the following binary form:

$$s \cdot 2^{N-1} + \text{frac}, (N=1, 2, 3, \ldots) \quad (1)$$

where s is the value of the most significant bit of the data and frac is the value of the lower (N−1) bits, respectively. A signed integer data of N bits can be analogously expressed in another form as $$s \cdot 2^{N-1} + \text{frac}, \quad (2)$$

wherein the negative sign "−" in front of s indicates that the integer is a signed operand.

1. Transforming Unsigned Operations for Signed Instructions

A subtraction result c between two unsigned data a and b can be represented as follows:

$$a = s_1 \cdot 2^{N-1} + \text{frac1}, \quad (3)$$

$$b = s \cdot 2^{N-1} + \text{frac2}, \quad (4)$$

then, $$c = a - b = (s_1 - s_2) \cdot 2^{N-1} + (\text{frac1} - \text{frac2}) \quad (5)$$

Equation (5) can be rewritten in the following form by using two signed integers m and n having values respectively corresponding to unsigned data a and b, where:

$$m = -s_2 \cdot 2^{N-1} + \text{frac1}, \quad (6)$$

$$n = s_1 \cdot 2^{N-1} + \text{frac2}, \quad (7)$$

$$c = a - b \text{ (operable with unsigned instruction)} \quad (8)$$

$$= (s_1 - s_2) \cdot 2^{N-1} + (\text{frac1} - \text{frac2})$$

$$= [(-s_2) \cdot 2^{N-1} + \text{frac1}] - [-s_1 \cdot 2^{N-1} + \text{frac2}]$$

$$= m - n \text{ (operable with signed instruction)}.$$

Exchanging the most significant bits of a and b and adding an appropriate sign bit to each as shown in Equations (6) and (7) produces two new signed integers m and n. Note that the subtraction is carried out the same way with the same end results, but with different operands. Equation (8) states that an unsigned operation represented by Equation (5) can be transformed into a form that can be operated on using signed instructions. The transformation includes using two signed integers m and n as new operands in a second data representation to replace the original operands in a first data representation, unsigned a and b.

Figure 2:
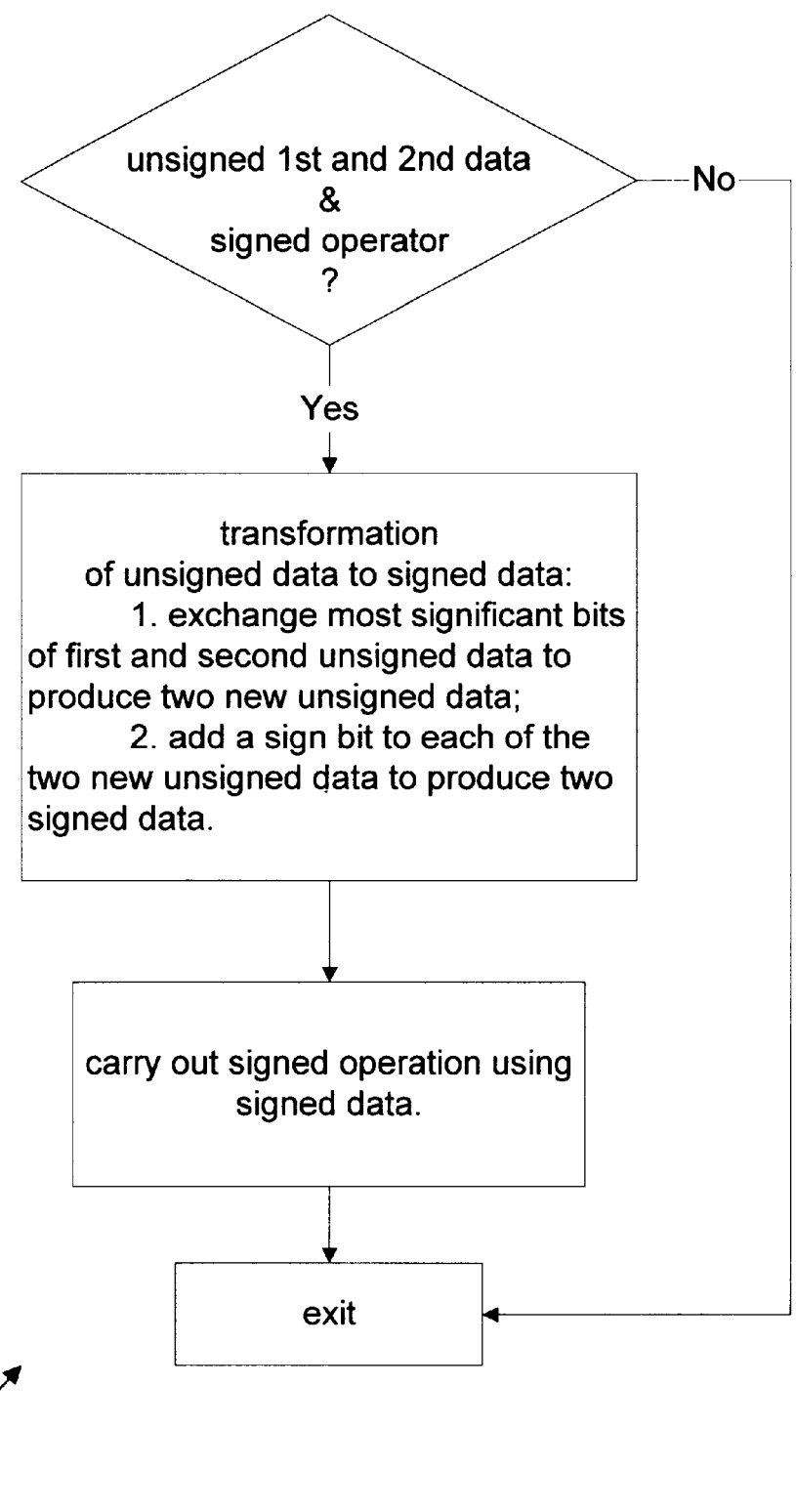
FIG. 2 is a flowchart of a preferred operation of transforming an unsigned operation between two unsigned numbers to an equivalent operation between two signed numbers using signed instructions.

FIG. 2 is a flowchart 200 showing the main steps of transforming an unsigned operation between two unsigned numbers (here, integers) to an equivalent operation between two signed integers using signed instructions. The above example for subtraction is only a special case. In step 201, the first unsigned operands are transformed to unsigned operands using the above transformation. For subtraction, the most significant bits of the two unsigned integers are exchanged and hence two new unsigned integers are produced. As part of the transformation, the new unsigned integers are converted into two new signed integers by adding the bit information indicative of sign. In step 202, signed instructions are used to perform an operation between the two new signed integers in conventional fashion.

2. Transforming Signed Operations for Unsigned Instructions

Analogous transformation can be used to transform signed operations for unsigned instructions.

A subtraction result z between two signed data x and y with the same bit pattern can be expressed as:

$$x = -s_1 \cdot 2^{N-1} + \text{frac1}, \quad (9)$$

$$y = -s_2 \cdot 2^{N-1} + \text{frac2}, \quad (10)$$

$$z = x - y = (s_2 - s_1) \cdot 2^{N-1} + (\text{frac1} - \text{frac2}). \quad (11)$$

Exchanging the most significant bits of x and y in the following manner defines two unsigned integers p and q that can be used to replace x and y in Equation (11):

$$p = s_2 \cdot 2^{N-1} + \text{frac1}, \quad (12)$$

$$q = s_1 \cdot 2^{N-1} + \text{frac2}, \quad (13)$$

$$z = x - y \text{ (operable with signed instructions)} \quad (14)$$

$$= [s_2 \cdot 2^{N-1} + \text{frac1}] - [s_1 \cdot 2^{N-1} + \text{frac2}]$$

$$= p - q \text{ (operable with unsigned instructions)}.$$

This exchange of the most significant bits allows a transformation from a first data representation, signed x and y, to a second data representation, unsigned p and q, as defined by Equations (12) and (13). Such a conversion enables the microprocessor to perform unsigned instructions on signed operations.

Figure 3:
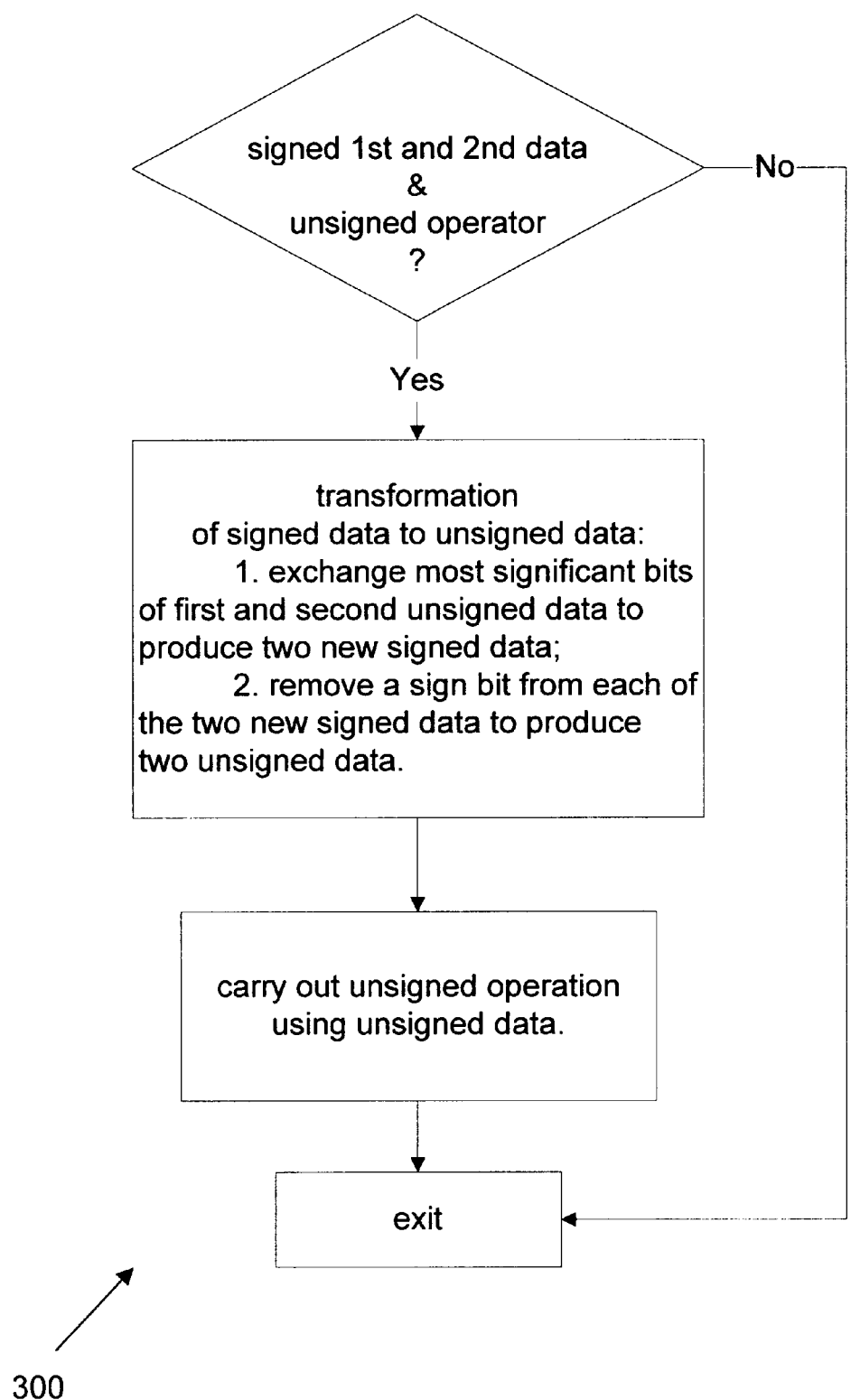
FIG. 3 is a flowchart of a preferred operation of transforming a signed operation between two signed numbers to an equivalent operation between two unsigned numbers using unsigned instructions.

FIG. 3 is a flowchart 300 showing the main steps of transformation of an operation between two signed number (here, integers) to an equivalent operation between two unsigned integers using unsigned instructions. The above example for subtraction is only a special case. In step 301, signed operands are transformed to unsigned operands using the above transformation. For subtraction, the most significant bits of the two signed integers are exchanged and hence two new signed integers are produced. As part of the transformation, the new signed integers are converted into two new unsigned integers by eliminating the bit information indicative of sign. In step 302, unsigned instructions are used to perform an operation between the two new unsigned integers in conventional fashion.

Although the present invention has been described in detail with reference to the preferred embodiment, one ordinarily skilled in the art to which this invention pertains will appreciate that various modifications and enhancements may be made without departing from the spirit and scope of the following claims.

What is claimed is:

1. A method of operating a microprocessor, comprising:
   changing first and second unsigned data from an unsigned format into a signed format by using a data transformation by:
   separating the most significant bit from other bits of each data;
   combining the most significant bit of said first unsigned data to the other bits of said second unsigned data and adding a sign bit to produce a first signed data; and
   combining the most significant bit of said second unsigned data to the other bits of said first unsigned data and adding a sign bit to produce a second signed data,
   wherein a selected operation on first and second unsigned data requires an unsigned instruction designed for operating on unsigned data; and
   applying a sinned instruction on said first and second signed data in said signed format so as to effect said operation by said unsigned instruction on said first and second unsigned data without requiring said unsigned instruction in the microprocessor.

2. A method as in claim 1, wherein:
   said operation includes a subtraction between two unsigned numbers having the same bit length; and said data transformation is operable to transform said subtraction of said two unsigned numbers into a substraction of said two signed numbers.

3. A method for operating a microprocessor, comprising:

exchanging the most significant bits of a first and second unsigned data to produce a third and fourth unsigned data;

forming a first signed data with said third unsigned data and a second signed data with said fourth unsigned data by adding a sign bit to each of said third and fourth signed data; and applying a signed instruction to perform a signed subtraction between said first signed data and said second signed data, whereby said microprocessor is operable to perform an unsigned subtraction operation between said unsigned first and second data without a designated signed instruction for the substraction.

* * * * *